(12) United States Patent
Du et al.

(10) Patent No.: US 10,000,196 B2
(45) Date of Patent: Jun. 19, 2018

(54) APPARATUS AND METHOD FOR CONTROLLING TORQUE REDUCTION OF HYBRID ELECTRIC VEHICLE

(71) Applicant: Hyundai Motor Company, Seoul (KR)

(72) Inventors: Gwang Il Du, Incheon (KR); Teh Hwan Cho, Gyeonggi-do (KR); Jee Wook Huh, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 255 days.

(21) Appl. No.: 14/929,707

(22) Filed: Nov. 2, 2015

(65) Prior Publication Data

US 2016/0368477 A1    Dec. 22, 2016

(30) Foreign Application Priority Data

Jun. 19, 2015 (KR) .......................... 10-2015-0087554

(51) Int. Cl.
*B60W 10/08* (2006.01)
*B60W 10/06* (2006.01)
(Continued)

(52) U.S. Cl.
CPC .............. *B60W 10/08* (2013.01); *B60K 6/48* (2013.01); *B60W 10/06* (2013.01); *B60W 20/15* (2016.01);
(Continued)

(58) Field of Classification Search
CPC ...... B60W 10/08; B60W 20/15; B60W 10/06; B60W 30/18172; B60W 30/1882; B60W 2510/244; B60W 2520/26; B60W 2710/083; B60K 6/48; B60K 2006/4825; B60Y 2200/92; Y02T 10/6221; Y02T 10/06252; Y02T 10/6286; Y10S 903/93
See application file for complete search history.

(56) References Cited

U.S. PATENT DOCUMENTS

| 6,263,267 B1 * | 7/2001 | Anthony ................ B60K 6/485 |
| | | 180/65.26 |
| 2005/0060080 A1 * | 3/2005 | Phillips .................... B60K 6/44 |
| | | 701/54 |

(Continued)

FOREIGN PATENT DOCUMENTS

| JP | 2006-144589 A | 6/2006 |
| JP | 2013-151247 A | 8/2013 |

(Continued)

*Primary Examiner* — Thomas G Black
*Assistant Examiner* — Sze-Hon Kong
(74) *Attorney, Agent, or Firm* — Mintz Levin Cohn Ferris Glovsky and Popeo, P.C.; Peter F. Corless

(57) ABSTRACT

A method for controlling torque reduction of a hybrid electric vehicle including a motor and an engine as a power source includes: determining whether a traction control system (TCS) is operating; calculating a demand torque of the TCS when the TCS is operating; determining an engine operating point according to the demand torque of the TCS; maintaining an engine torque according to the engine operating point; comparing a difference between the demand torque of the TCS and the engine torque according to the engine operating point with a charging limit torque of the motor; and performing torque reduction using a motor torque and the engine torque based on a result of the comparison.

11 Claims, 5 Drawing Sheets

(51) Int. Cl.
 *B60K 6/48* (2007.10)
 *B60W 30/18* (2012.01)
 *B60W 20/15* (2016.01)
 *B60W 30/188* (2012.01)

(52) U.S. Cl.
 CPC ............... *B60W 30/18172* (2013.01); *B60K 2006/4825* (2013.01); *B60W 30/1882* (2013.01); *B60W 2510/244* (2013.01); *B60W 2520/26* (2013.01); *B60W 2710/083* (2013.01); *B60Y 2200/92* (2013.01); *Y02T 10/6221* (2013.01); *Y02T 10/6252* (2013.01); *Y02T 10/6286* (2013.01); *Y10S 903/93* (2013.01)

(56) References Cited

U.S. PATENT DOCUMENTS

| | | | | |
|---|---|---|---|---|
| 2013/0179015 A1* | 7/2013 | Liang | ............ | B60W 10/08 701/22 |
| 2013/0297107 A1* | 11/2013 | Dai | ............ | B60W 10/06 701/22 |
| 2014/0038772 A1* | 2/2014 | Dai | ............ | B60W 20/106 477/3 |
| 2015/0166044 A1* | 6/2015 | Kim | ............ | B60K 6/48 701/22 |
| 2015/0284005 A1* | 10/2015 | Suzuki | ............ | B60T 8/00 701/22 |
| 2015/0298678 A1* | 10/2015 | Yu | ............ | B60W 10/06 701/22 |

FOREIGN PATENT DOCUMENTS

| | | |
|---|---|---|
| KR | 10-2010-0056942 A | 5/2010 |
| KR | 10-1490954 B1 | 2/2015 |

* cited by examiner

APPARATUS AND METHOD FOR CONTROLLING TORQUE REDUCTION OF HYBRID ELECTRIC VEHICLE

CROSS-REFERENCE TO RELATED APPLICATION

This application claims priority to and the benefit of Korean Patent Application No. 10-2015-0087554 filed in the Korean Intellectual Property Office on Jun. 19, 2015, the entire contents of which are incorporated herein by reference.

BACKGROUND OF THE DISCLOSURE (a) Technical Field

The present disclosure relates generally to an apparatus and a method for controlling torque reduction of a hybrid electric vehicle. More particularly, the present disclosure relates to an apparatus and a method for controlling torque reduction of a hybrid electric vehicle that maintains an engine torque according to an engine operating point and performs torque reduction by using a motor torque when a demand torque of a traction control system (TCS) is generated.

(b) Description of the Related Art

Generally, a hybrid electric vehicle is driven by an engine which generates torque from fuel combustion and an electric motor which generates torque from an electric battery. Hybrid electric vehicles can include a hybrid control unit (HCU) for controlling an engine operation of the hybrid electric vehicle, an engine control unit (ECU) for controlling an operation of an engine, a motor control unit (MCU) for controlling an operation of the driving motor, a transmission control unit (TCU) for controlling an operation of the transmission, and a battery management system (BMS) for managing a condition of a battery.

Meanwhile, a traction control system (TCS) is a safety system for preventing wheel spin and improving driving stability by controlling a brake and an engine while starting or accelerating. The TCS is mounted on the hybrid electric vehicle and requests torque reduction when wheel spin occurs while starting or accelerating.

Conventionally, if a demand torque of the TCS is generated when the TCS requests torque reduction, the hybrid electric vehicle decreases engine torque. Then, if the decreased engine torque cannot satisfy the demand torque of the TCS, the hybrid electric vehicle decreases motor torque to satisfy the demand torque of the TCS. However, in a case that the demand torque of the TCS is satisfied using the motor torque, a state of charge (SOC) of the battery is depleted. As a result, power performance of the motor deteriorates. Moreover, a demand torque of a driver cannot be satisfied after finishing an operation of the TCS, so the hybrid electric vehicle cannot smoothly start again.

The above information disclosed in this Background section is only for enhancement of understanding of the background of the disclosure, and therefore, it may contain information that does not form the related art that is already known in this country to a person of ordinary skill in the art.

SUMMARY OF THE DISCLOSURE

The present disclosure has been made in an effort to provide an apparatus and a method for controlling torque reduction of a hybrid electric vehicle having advantages of maintaining an engine torque according to an engine operating point and performing torque reduction by using a motor torque when a demand torque of a traction control system (TCS) is generated.

Embodiments of the present disclosure provide a method for controlling torque reduction of a hybrid electric vehicle including a motor and an engine as a power source that includes: determining whether a traction control system (TCS) is operating; calculating a demand torque of the TCS when the TCS is operating; determining an engine operating point according to the demand torque of the TCS; maintaining an engine torque according to the engine operating point; comparing a difference between the demand torque of the TCS and the engine torque according to the engine operating point with a charging limit torque of the motor; and performing torque reduction using a motor torque and an engine torque based on a result of the comparison.

The performing of torque reduction may use only the motor torque when a charging limit torque of the motor is greater than or equal to the difference between the demand torque of the TCS and the engine torque according to the engine operating point.

The performing of torque reduction may increase the engine torque when the charging limit torque of the motor is less than the difference between the demand torque of the TCS and the engine torque according to the engine operating point.

The performing of torque reduction may use the charging limit torque of the motor and the increased engine torque.

The engine operating point according to the demand torque of the TCS may be determined as a value to maintain a state of charge (SOC) of a battery of the vehicle while the TCS is operating.

The maintaining of the engine torque according to the engine operating point may decrease the engine torque and add a compensation torque according to the SOC of the battery.

Furthermore, according to embodiments of the present disclosure, an apparatus for controlling torque reduction of a hybrid electric vehicle including a motor and an engine as a power source includes: a driving information detector detecting a running state of the vehicle and demand information of a driver of the vehicle; a traction control system (TCS) preventing a wheel slip of the vehicle; and a controller controlling an output torque of the engine and the motor based on a signal from the driving information detector, determining an engine operating point according to a demand torque of the TCS when the TCS is operating, maintaining an engine torque according to the engine operating point, comparing a difference between the demand torque of the TCS and the engine torque according to the engine operating point with a charging limit torque of the motor, and performing torque reduction using a motor torque and the engine torque based on a result of the comparison.

The controller may perform the torque reduction using only the motor torque when the charging limit torque of the motor is greater than or equal to the difference between the demand torque of the TCS and the engine torque according to the engine operating point.

The controller may increase the engine torque when the charging limit torque of the motor is less than the difference between the demand torque of the TCS and the engine torque according to the engine operating point.

The controller may perform the torque reduction using the charging limit torque of the motor and the increased engine torque.

The controller may determine the engine operating point according to the demand torque of the TCS to maintain an SOC of a battery of the vehicle when the TCS is operating.

The controller may maintain the engine torque according to the engine operating point by decreasing the engine torque and adding a compensation torque according to the SOC of the battery.

Furthermore, in accordance with embodiments of the present disclosure, a non-transitory computer readable medium containing program instructions for controlling torque reduction of a hybrid electric vehicle including a motor and an engine as a power source includes: program instructions that determine whether a traction control system (TCS) is operating; program instructions that calculate a demand torque of the TCS when the TCS is operating; program instructions that determine an engine operating point according to the demand torque of the TCS; program instructions that maintain an engine torque according to the engine operating point; program instructions that compare a difference between the demand torque of the TCS and the engine torque according to the engine operating point with a charging limit torque of the motor; and program instructions that perform torque reduction using a motor torque and the engine torque based on a result of the comparison.

As described above, according to embodiments of the present disclosure, a battery SOC can be maintained during operation of the TCS, so a problem that a demand torque of a driver is not satisfied due to exhaustion of the battery SOC can be prevented. In addition, engine efficiency can be improved by determining an engine operating point, so fuel efficiency and power performance of the hybrid electric vehicle can be improved. Accordingly, even if the TCS is frequently operated on a snowy road or an icy road in winter, drivability and stability of the hybrid electric vehicle can be improved.

DETAILED DESCRIPTION OF THE EMBODIMENTS

Figure 1:
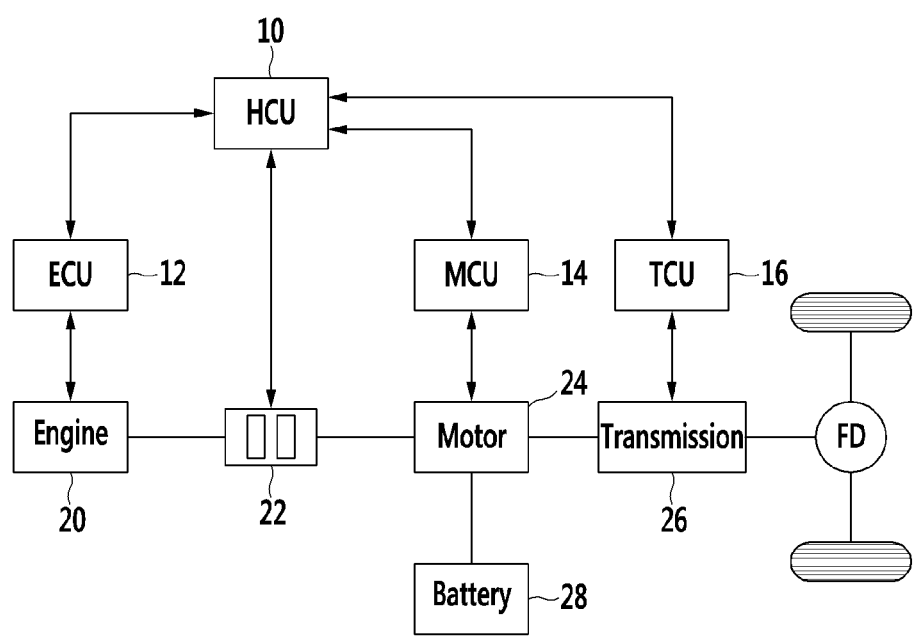
FIG. 1 is a schematic diagram of a hybrid system to which a method for controlling torque reduction of a hybrid electric vehicle is applied according to embodiments of the present disclosure.

In the following detailed description, only certain embodiments of the present disclosure have been shown and described, simply by way of illustration. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. Throughout this specification and the claims which follow, unless explicitly described to the contrary, the word "comprise" and variations such as "comprises" or "comprising" will be understood to imply the inclusion of stated elements but not the exclusion of any other elements. Further, the singular forms "a", "an" and "the" are intended to include the plural forms as well, unless the context clearly indicates otherwise.

It is understood that the term "vehicle" or "vehicular" or other similar term as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example, vehicles powered by both gasoline and electricity.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

Embodiments of the present disclosure will hereinafter be described in detail with reference to the accompanying drawings.

FIG. 1 is a schematic diagram of a hybrid system to which a method for controlling torque reduction of a hybrid electric vehicle is applied according to Embodiments of the present disclosure.

The hybrid system as shown in FIG. 1 is illustrated for better comprehension and ease of description. Therefore, a method for controlling engine starting while shifting of a hybrid electric vehicle according to an exemplary embodiment of the present disclosure may not only be applied to the hybrid system as shown in FIG. 1, but may also be applied to all other hybrid systems.

As shown in FIG. 1, the hybrid system to which a method for controlling torque reduction of a hybrid electric vehicle is applied according to embodiments of the present disclosure includes a hybrid control unit (HCU) 10, an electronic control unit (ECU) 12, a motor control unit (MCU) 14, a transmission control unit (TCU) 16, an engine 20, an engine clutch 22, a motor 24, a transmission 26, and a battery 28.

The HCU 10 controls operation of other controllers which mutually exchange information in an entire operation of a hybrid electric vehicle, so that the HCU 10 controls output torque of the engine 20 and the motor 24 by cooperating with the other controllers.

The ECU 12 controls an entire operation of the engine 20 according to conditions of the engine 20, such as a demand torque of a driver, a coolant temperature, and an engine torque.

The MCU 14 controls an entire operation of the motor 24 according to a demand torque of a driver, a driving mode of the hybrid electric vehicle, and an SOC condition of the battery 28.

The TCU 16 controls an entire operation of the transmission 26 such as speed ratios of the transmission 26 depending on output torque of the engine 20 and the motor 24, and an amount of regenerative braking.

The engine 20 outputs power as a power source while turned on.

The engine clutch 22 is disposed between the engine 20 and the motor 24 to receive a control signal of the HCU 10, and selectively connects the engine 20 and the motor 24 according to a driving mode of the hybrid electric vehicle.

The motor 24 is operated by a 3-phase AC voltage applied from the battery 28 through an inverter to generate torque, and operates as a power generator and supplies regenerative energy to the battery 28 in a coast-down mode.

The transmission 26 supplies a sum of an output torque of the engine 20 and an output torque of the motor 24 determined by coupling and releasing of the engine clutch 22 as an input torque and selects any shift gear according to a vehicle speed and a driving condition to output driving force to a driving wheel and maintain driving.

The battery 28 is composed of a plurality of unit cells, and stores a high voltage for supplying a voltage to the motor 24, for example, 400 V or 450 V DC.

Figure 2:
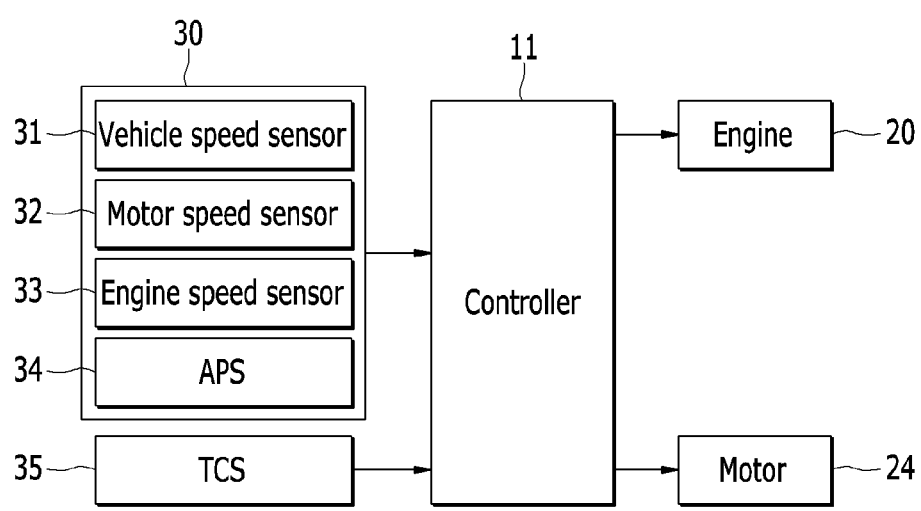
FIG. 2 is a block diagram of an apparatus for controlling torque reduction of a hybrid electric vehicle according to embodiments of the present disclosure.

FIG. 2 is a block diagram of an apparatus for controlling torque reduction of a hybrid electric vehicle according to embodiments of the present disclosure.

As shown in FIG. 2, an apparatus for controlling torque reduction of a hybrid electric vehicle according to embodiments of the present disclosure includes a driving information detector 30, a traction control system (TCS) 35, a controller 11, an engine 20 and a motor 24.

Processes in the method for controlling torque reduction of the hybrid electric vehicle according to embodiments of the present disclosure to be described below may be performed by integrating or subdividing due to each controller. Therefore, for convenience of description, in this specification and claims, many controllers provided in the hybrid electric vehicle are called the controller 11.

The hybrid electric vehicle to which embodiments of the present disclosure are applied includes at least one engine 20 and at least one motor 24. In addition, the hybrid electric vehicle provides a driving mode in which the engine 20 and the motor 24 operate separately or simultaneously as a power source. For this purpose, the engine clutch is disposed between the engine 20 and the motor 24 to selectively connect the engine 20 and the motor 24.

The driving information detector 30 detects a running state of the hybrid electric vehicle and demand information of a driver, and includes a vehicle speed sensor 31, a motor speed sensor 32, an engine speed sensor 33, and an accelerator pedal position sensor (APS) 34.

The vehicle speed sensor 31 detects a speed of the vehicle, and transmits a corresponding signal to the controller 11.

The motor speed sensor 32 detects a rotation speed of the motor 24, and transmits a corresponding signal to the controller 11.

The engine speed sensor 33 detects a rotation speed of the engine 20, and transmits a corresponding signal to the controller 11.

The accelerator pedal position sensor 34 continuously detects a position value of an accelerator pedal, and transmits a monitoring signal to the controller 11. The position value of the accelerator pedal may be 100% when the accelerator pedal is pressed fully, and the position value of the accelerator pedal may be 0% when the accelerator pedal is not pressed at all.

A throttle valve position sensor (TPS) that is mounted on an intake pipe may be used instead of the accelerator pedal position sensor 34. Therefore, for the purposes of the present disclosure, the accelerator pedal position sensor 34 should include the throttle valve position sensor, and the position value of the accelerator pedal should be understood to be an opening value of the throttle valve.

The TCS 35 is a safety system configured to control a driving torque for preventing a wheel spin when the vehicle starts out or accelerates on a snowy road or an icy road. Therefore, when the wheel spin occurs because the hybrid electric vehicle starts out or accelerates on a slippery road, the TCS 35 requests torque reduction by outputting a demand torque.

The controller 11 determines an engine operating point according to a demand torque of the TCS when the TCS is operating, maintains an engine torque according to the engine operating point, and performs torque reduction by using a motor torque and the engine torque based on a difference between the demand torque of the TCS and the engine torque according to the engine operating point. The controller may compare the difference between the demand torque of the TCS and the engine torque according to the engine operating point with a charging limit torque of the motor, and perform torque reduction by using only the motor torque when the charging limit torque of the motor is greater than or equal to the difference.

On the other hand, the controller may increase the engine torque when the charging limit torque of the motor is less than the difference. For these purposes, the controller 11 may be implemented as at least one processor that is operated by a predetermined program, and the predetermined program may be programmed in order to perform each step of a method for controlling torque reduction of a hybrid electric vehicle according to embodiments of the present disclosure.

Various embodiments described herein may be implemented within a recording medium that may be read by a computer or a similar device by using software, hardware, or a combination thereof, for example.

According to a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units designed to perform any other functions. According to a software implementation, embodiments such as procedures and functions described in the present embodiments may be implemented by separate software modules. Each of the software modules may perform one or more functions and operations described in the present disclosure. A software code may be implemented by a software application written in an appropriate program language.

Hereinafter, a method for controlling torque reduction of the hybrid electric vehicle according to embodiments of the present disclosure will be described in detail with reference to FIG. 3 to FIG. 5.

Figure 3:
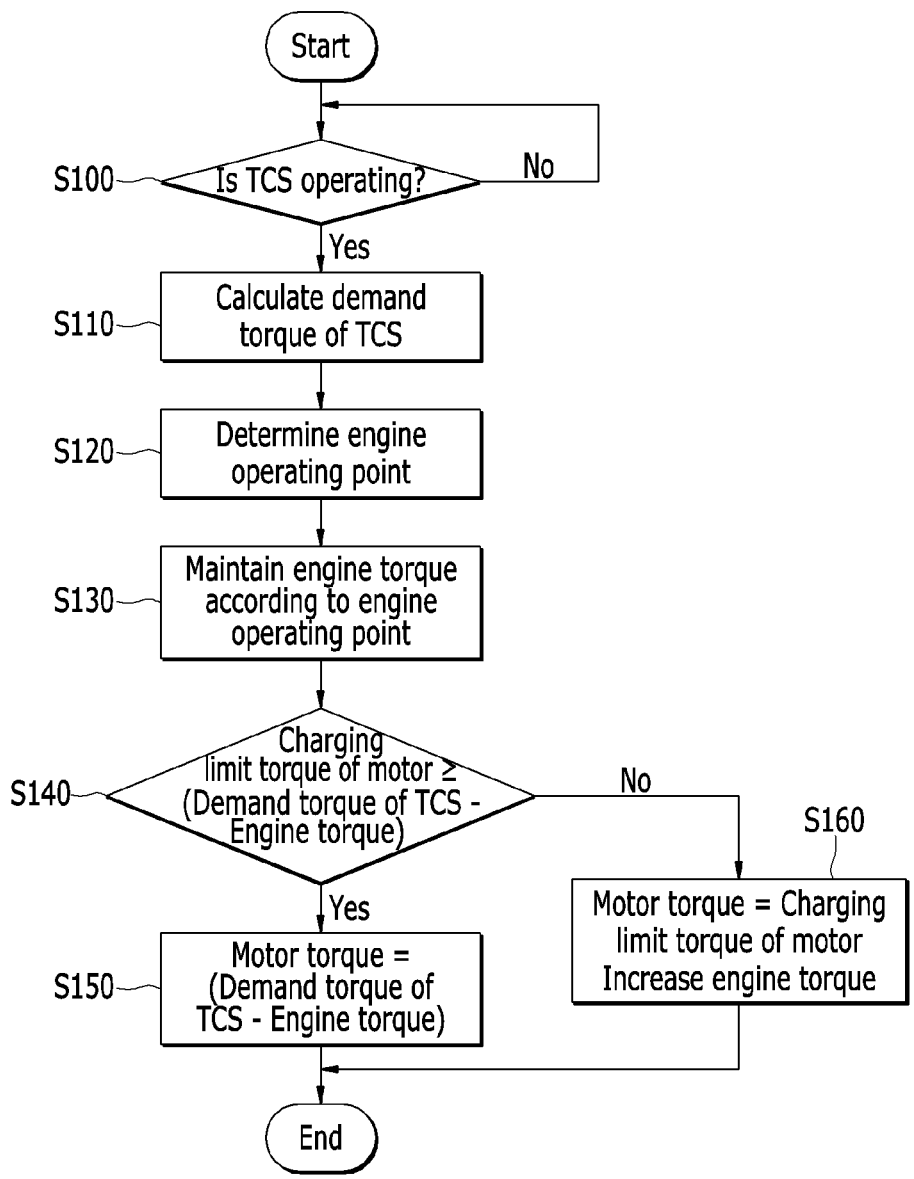
FIG. 3 is a flowchart showing a method for controlling torque reduction of a hybrid electric vehicle according to embodiments of the present disclosure.

FIG. 3 is a flowchart showing a method for controlling torque reduction of the hybrid electric vehicle according to embodiments of the present disclosure.

As shown in FIG. 3, a method for controlling torque reduction of the hybrid electric vehicle according to the present disclosure begins with the controller 11 determining whether the TCS 35 is operating at step S100.

When the TCS 35 is operating at the step S100, the controller 11 calculates a demand torque of the TCS at step S110.

When the demand torque of the TCS is calculated at the step S110, the controller 11 determines an engine operating point according to the demand torque of the TCS at step S120. The engine operating point according to the demand torque of the TCS may be determined as a value to maintain an SOC of the battery while the TCS is operating.

When the engine operating point according to the demand torque of the TCS is determined at the step S120, the controller 11 maintains an engine torque according to the engine operating point at step S130. Herein, the controller 11 decreases the engine torque and adds a compensation torque according to the SOC of the battery.

The compensation torque according to the SOC of the battery may be determined by a predetermined map. For example, if the SOC of the battery is 20%, the compensation torque is determined as 15 Nm, if the SOC of the battery is 40%, the compensation torque is determined as 10 Nm, if the SOC of the battery is 60%, the compensation torque is determined as 5 Nm, and if the SOC of the battery is 90%, the compensation torque is determined as 0 Nm.

After that, the controller 11 compares a difference between the demand torque of the TCS and the engine torque according to the engine operating point with a charging limit torque of the motor at step S140. If the charging limit torque of the motor is greater than or equal to the difference between the demand torque of the TCS and the engine torque according to the engine operating point at the step S140, it means that the demand torque of the TCS can be satisfied by only the motor torque. Therefore, the controller 11 determines the motor torque as the difference between the demand torque of the TCS and the engine torque according to the engine operating point, and performs torque reduction by using only the motor torque at step S150.

On the other hand, if the charging limit torque of the motor is less than the difference between the demand torque of the TCS and the engine torque according to the engine operating point at the S140, it means that the demand torque of the TCS cannot be satisfied by only the motor torque because the motor has the charging limit. Therefore, the controller 11 determines the motor torque as the charging limit torque of the motor which is a maximum output torque of the motor, increases the engine torque, and performs torque reduction at step S160.

Figure 4:
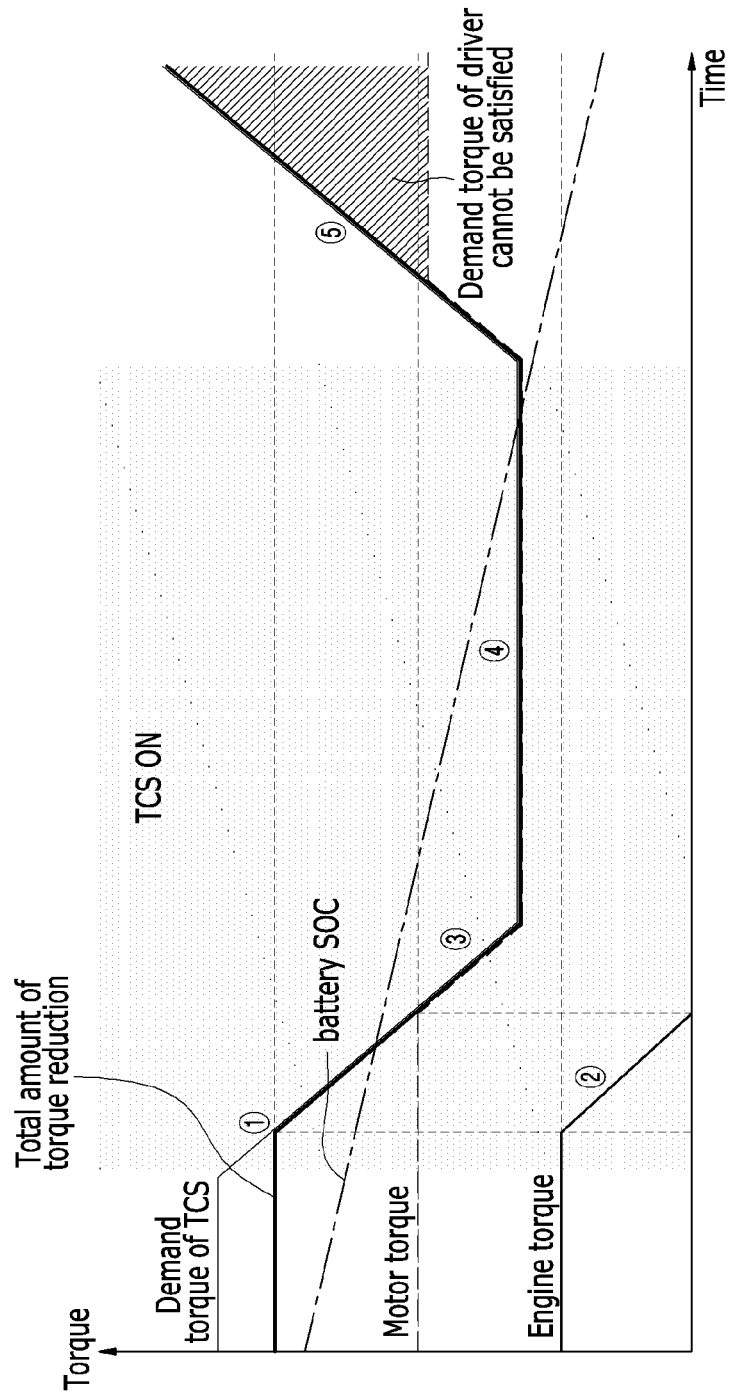
FIG. 4 is a diagram showing a total amount of torque reduction to which a method for controlling torque reduction of a hybrid electric vehicle is applied according to a conventional art.
Figure 5:
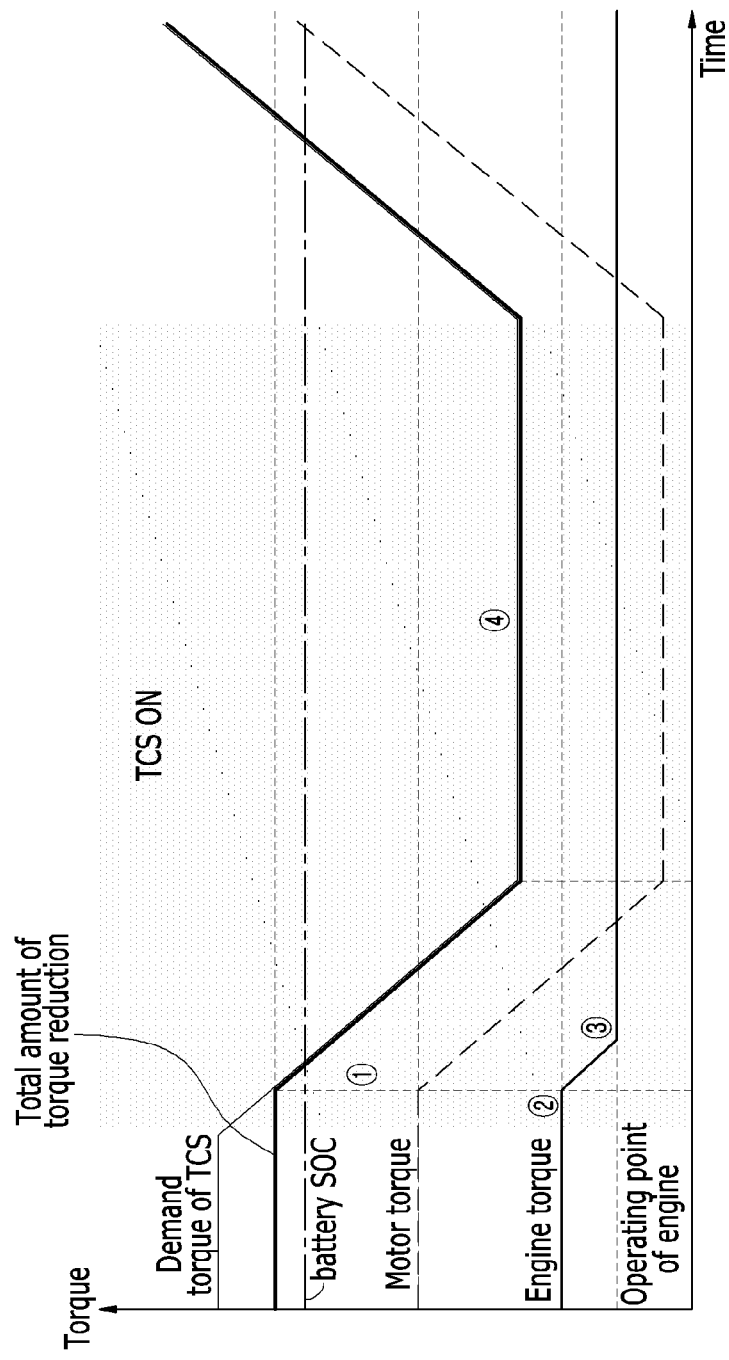
FIG. 5 is a diagram showing a total amount of torque reduction to which a method for controlling torque reduction of a hybrid electric vehicle is applied according to embodiments of the present disclosure.

FIG. 4 is a diagram showing a total amount of torque reduction to which a method for controlling torque reduction of a hybrid electric vehicle is applied according to a conventional art, and FIG. 5 is a diagram showing a total amount of torque reduction to which a method for controlling torque reduction of a hybrid electric vehicle is applied according to embodiments of the present disclosure.

As shown in FIG. 4, a method for controlling torque reduction of a hybrid electric vehicle according to a conventional art firstly decreases an engine torque like No. 2 when a demand torque of the TCS is generated. After that, if the demand torque of the TCS is not satisfied by the engine torque, the conventional method decreases a motor torque like No. 3. That is, the motor is continuously used after the engine torque becomes 0, the SOC of the battery is thereby depleted. Therefore, a problem that a demand torque of a driver is not satisfied when the hybrid electric vehicle starts again after finishing an operation of the TCS occurs like No. 5.

On the contrary, as shown in FIG. 5, a method for controlling torque reduction of a hybrid electric vehicle is applied according to embodiments of the present disclosure may simultaneously decrease the motor torque and the engine torque, like No. 1 and No. 2. Therefore, the engine torque is maintained according to the engine operating point and the demand torque of the TCS is satisfied by the engine torque and the motor torque, such that the SOC of the battery can be maintained.

As described above, according to embodiments of the present disclosure, a battery SOC can be maintained during an operation of the TCS, such that a problem of a demand torque of a driver not being satisfied due to depletion of the battery SOC can be prevented. In addition, engine efficiency can be improved by determining an engine operating point, so fuel efficiency and power performance of the hybrid electric vehicle can be improved.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A method for controlling torque reduction of a hybrid electric vehicle including a motor and an engine as a power source, comprising:
    determining whether a traction control system (TCS) is operating;
    calculating a demand torque of the TCS when the TCS is operating;
    determining an engine operating point according to the demand torque of the TCS as a value to maintain a state of charge (SOC) of a battery of the vehicle while the TCS is operating;
    maintaining an engine torque according to the engine operating point;
    comparing a difference between the demand torque of the TCS and the engine torque according to the engine operating point with a charging limit torque of the motor; and
    performing torque reduction using a motor torque and the engine torque based on a result of the comparison.

2. The method of claim 1, further comprising:
    performing the torque reduction using only the motor torque when the charging limit torque of the motor is greater than or equal to the difference between the demand torque of the TCS and the engine torque according to the engine operating point.

3. The method of claim 1, wherein the performing of the torque reduction increases the engine torque when the charging limit torque of the motor is less than the difference between the demand torque of the TCS and the engine torque according to the engine operating point.

4. The method of claim 3, further comprising:
    performing the torque reduction using the charging limit torque of the motor and the increased engine torque.

5. The method of claim 1, wherein the maintaining of the engine torque according to the engine operating point decreases the engine torque and adds a compensation torque according to the SOC of the battery.

6. An apparatus for controlling torque reduction of a hybrid electric vehicle including a motor and an engine as a power source, comprising:
- a driving information detector detecting a running state of the vehicle and demand information of a driver of the vehicle;
- a traction control system (TCS) preventing a wheel slip of the vehicle; and
- a controller controlling an output torque of the engine and the motor based on a signal from the driving information detector determining an engine operating point according to a demand torque of the TCS to maintain a state of charge (SOC) of a battery of the vehicle when the TCS is operating, maintaining an engine torque according to the engine operating point, comparing a difference between the demand torque of the TCS and the engine torque according to the engine operating point with a charging limit torque of the motor, and performing torque reduction using a motor torque and the engine torque based on a result of the comparison.

7. The apparatus of claim 6, wherein the controller performs the torque reduction using only the motor torque when the charging limit torque of the motor is greater than or equal to the difference between the demand torque of the TCS and the engine torque according to the engine operating point.

8. The apparatus of claim 6, wherein the controller increases the engine torque when the charging limit torque of the motor is less than the difference between the demand torque of the TCS and the engine torque according to the engine operating point.

9. The apparatus of claim 8, wherein the controller performs the torque reduction using the charging limit torque of the motor and the increased engine torque.

10. The apparatus of claim 6, wherein the controller maintains the engine torque according to the engine operating point by decreasing the engine torque and adding a compensation torque according to the SOC of the battery.

11. A non-transitory computer readable medium containing program instructions for controlling torque reduction of a hybrid electric vehicle including a motor and an engine as a power source, the computer readable medium comprising:
- program instructions that determine whether a traction control system (TCS) is operating;
- program instructions that calculate a demand torque of the TCS when the TCS is operating;
- program instructions that determine an engine operating point according to the demand torque of the TCS as a value to maintain a state of charge (SOC) of a battery of the vehicle while the TCS is operating;
- program instructions that maintain an engine torque according to the engine operating point;
- program instructions that compare a difference between the demand torque of the TCS and the engine torque according to the engine operating point with a charging limit torque of the motor; and
- program instructions that perform torque reduction using a motor torque and the engine torque based on a result of the comparison.

\* \* \* \* \*